INVENTORS.
Carl L. Sadler,
Robert H. Eisengrein,
George H. Hermanson.

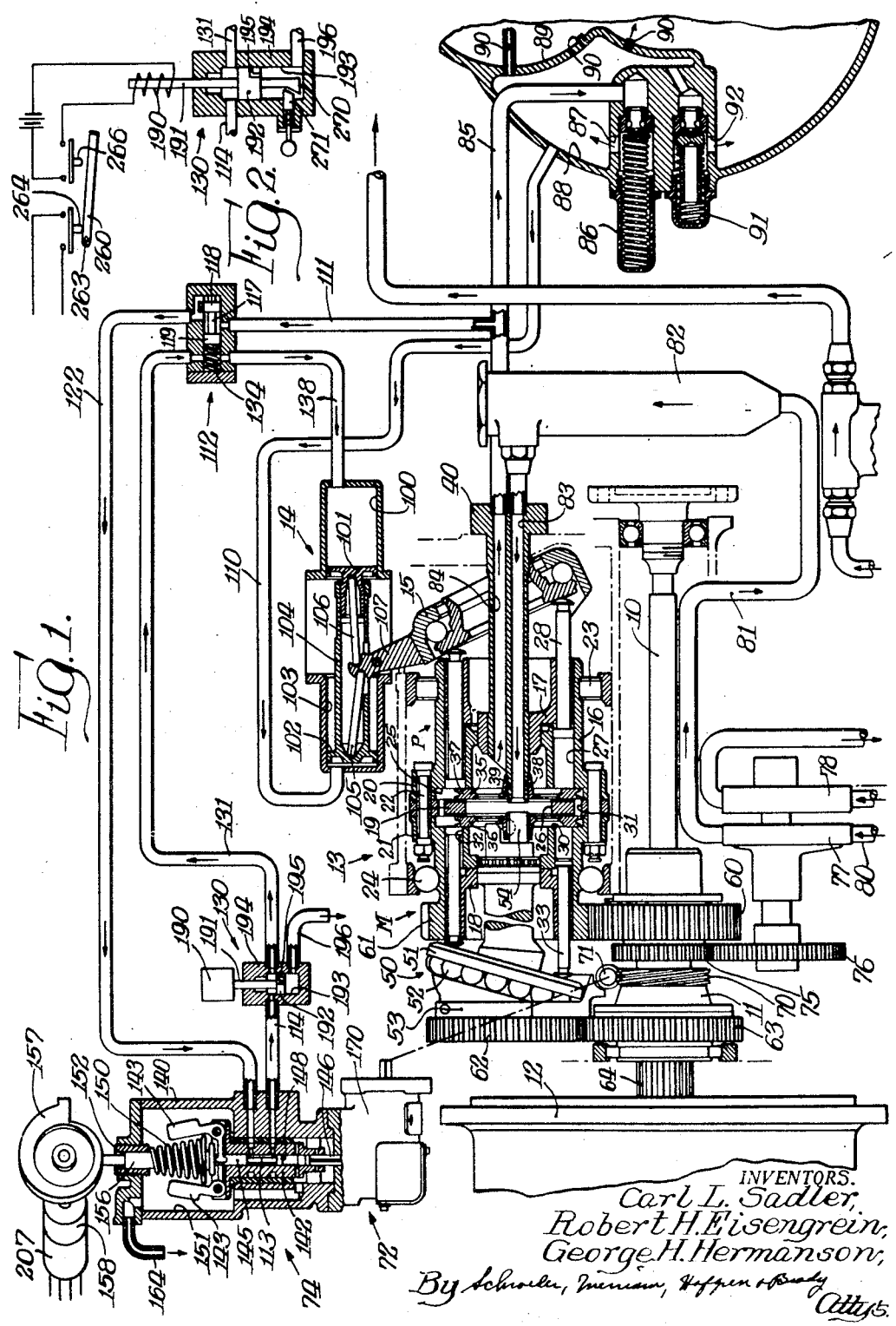

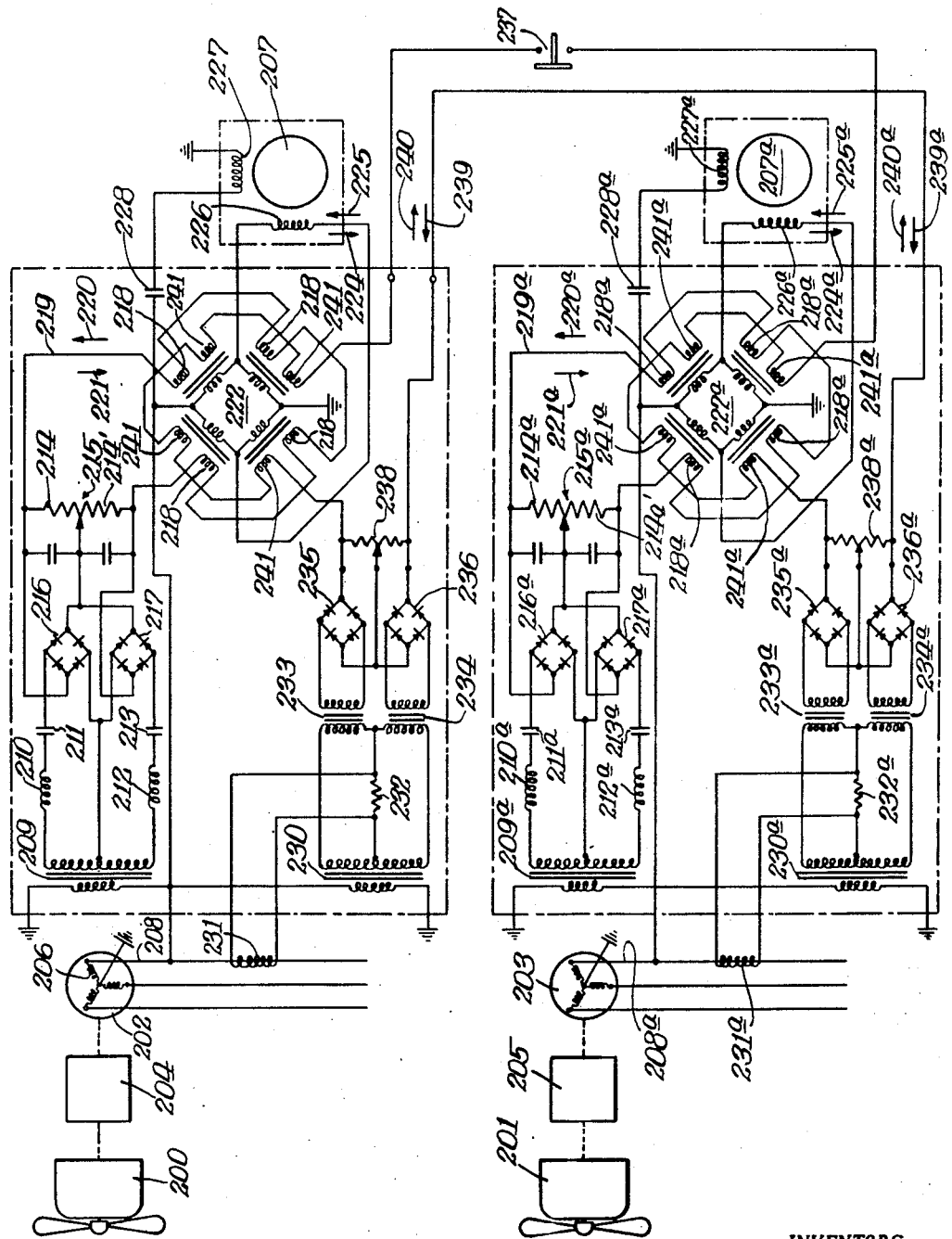

United States Patent Office 2,803,112
Patented Aug. 20, 1957

2,803,112

CONTROL MEANS FOR CONSTANT SPEED HYDRAULIC PUMP AND MOTOR TRANSMISSION

Carl L. Sadler, Jr., and Robert H. Eisengrein, Rockford, Ill., and George H. Hermanson, Toledo, Ohio, assignors to Sundstrand Machine Tool Co., a corporation of Illinois Application December 4, 1951, Serial No. 259,872

4 Claims. (Cl. 60—53)

This invention relates to control means and more particularly to hydraulically and electrically operated control means.

It is a general object of this invention to provide a new and improved control means.

Another object of the invention is to produce control means for a hydraulic transmission.

A further object of the invention is to produce a control means for a hydraulic transmission interposed between a driving element and a driven element with the control means operating to maintain the speed of the driven element constant regardless of changes of speed of the driving element.

Another object of the invention is to produce a control of the type described in the preceding paragraph which includes a governor driven by the driven element and controlling a supply of hydraulic fluid under pressure to adjust the hydraulic transmission to produce a constant speed of the driven element.

Another object of the invention is to produce a control means for a hydraulic transmission interposed between a driving element and a driven element and provided with adjustable means for varying the output of the transmission to maintain the speed of the driven element constant regardless of variations in the speed of the driving element, with the control being provided with a hydraulically operated device for adjusting the adjustable means and including a governor driven by the driven element and adapted to operate valve means to govern the supply of fluid to the device.

A further object of the invention is to provide a hydraulic circuit for a control of the type described in the preceding paragraph which includes a pressure differential valve interposed between a source of hydraulic fluid under pressure and the valve means and in which the circuit is doubled back through the differential pressure valve with the valve serving to produce a substantially constant pressure differential across the valve means regardless of changes in the pressure from the source.

Yet another object of the invention is to produce a differential pressure valve adaptable for use in control systems of the type described above which includes a casing having a bore, a spool valve slidable in the bore having two spaced lands, the valve being so constructed as to be connected to a source of hydraulic fluid and to the valve means through the intermediate portion of the bore with one end of the bore being subjected to fluid pressure from the source and with the other end of the bore being subjected to fluid pressure from the valve means.

Yet another object of the invention is to produce a control for a hydraulic transmission adapted for driving an alternator or the like with the transmission deriving its power from a source, the speed of which varies over a relatively wide range, and to include in such control means mechanism for maintaining the speed of the output shaft of the transmission, which drives the alternator, substantially constant.

A further object is to produce control of the type described in the preceding paragraph including means sensing the output of an alternator driven by the driven element with the sensing means being adapted to generate a signal in response to variations of the alternator output frequency from a predetermined operating condition, together with signal responsive means operating to adjust the control to vary the operation of the transmission to return the alternator to operation at such predetermined frequency.

Another object of the invention is to produce a control of the type described in the preceding paragraphs which includes means sensing the frequency of the current generated by an alternator and other means sensing the load carried by the alternator with the sensing means being adapted to generate a signal effective to modify the operation of the control to maintain the alternator operating at a predetermined frequency and under a predetermined load.

A further object of the invention is to produce a control means of the type described in the preceding paragraphs for use in conjunction with two hydraulic transmissions each driving a different alternator together with means sensing the load division between the alternators and operating when the division becomes unequal to generate a signal effective to modify the operation of the control means to produce an equal load division between the alternators.

Other and further objects of the invention will be readily apparent from the following description and drawings, in which:

Fig. 1 is a schematic diagram showing the control means of this invention as used with a hydraulic transmission interposed between a driven shaft and a driving shaft for driving the transmission;

Fig. 2 is a schematic diagram of the electrical circuit for the overspeed and underspeed switches;

Fig. 3 is an electrical circuit diagram showing electrical means for generating a signal in response to departures from a predetermined condition of the operation of a pair of parallel alternators;

Figure 4:
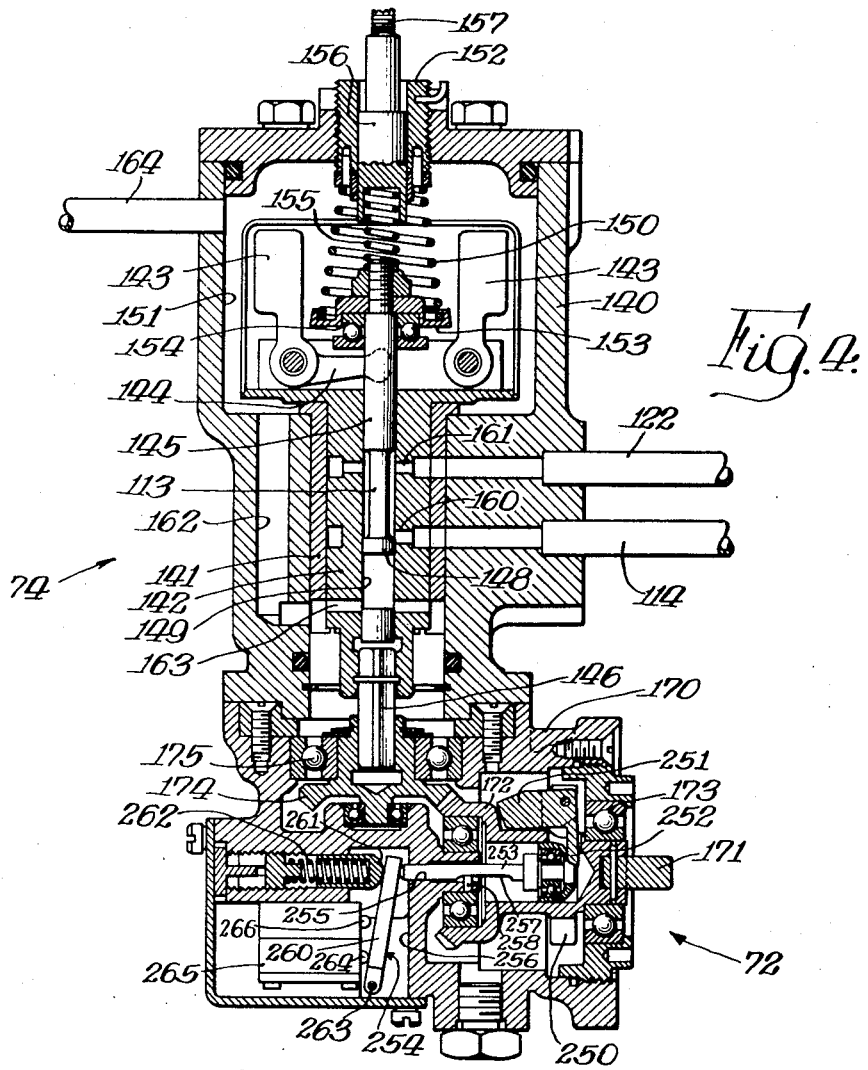
Fig. 4 is an enlarged sectional view of the governor control and associated drive mechanism.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

In the exemplary disclosure made in the drawings the invention is shown as embodied in a transmission of the general type described and shown in the Wahlmark Patent No. 2,474,706. The transmission is designed for employment in driving a device at a constant speed from a power source, which may vary widely in speed. It is contemplated that the device of this invention will be most widely used for driving alternators in an aircraft and thus is provided with an input or driving element 10 adapted for connection to the aircraft engine. The transmission is provided with an output or driven element 11 adapted to be connected to a device to be driven, for example an alternator 12. A hydraulic power and speed conversion unit 13 is provided to connect the driving element 10 with the driven element 11. Means 14 is provided for varying the operation of the transmission to obtain a constant speed of the driven element 11 though the driving element 10 varies either above or below the desired speed of the driven element. Thus, in the exemplary embodiment shown, the device to be driven is an alternator, such as a 400-cycle alternator adapted to be driven at a constant speed of 6,000 R. P. M. while the driving element 10 varies in speed from 2,100 to 8,000 R. P. M. or more. Control means is provided constantly and automatically to govern the means 14 to produce a constant speed of the driven element 11 regardless of the speed at which the driving element 10 is driven by the power source.

As best seen in Fig. 1, the transmission includes the hydraulic power and speed conversion unit 13. This unit in turn is comprised of a pump P and a motor M, each of the reciprocatory piston type, with the pump having a wobbler 15 adjustable in varying amounts to either side of neutral position to vary the direction as well as the quantity of fluid discharged from the pump to the motor. The hydraulic conversion unit as here shown is of the rotatable barrel or cylinder block type, and has the pump as well as the motor cylinders formed in the same rotatable cylinder block 16. Such a construction permits of readily obtaining rotation of the motor shaft at a speed either above or below that of the cylinder block, and hence of obtaining the constant speed of the motor shaft regardless of the rate of rotation of the cylinder block by adjustment of the wobbler 15. Adjustment of the wobbler 15 with respect to neutral determines whether the motor shaft is driven faster or slower than the cylinder block 16 and the extent that the wobbler 15 is swung from its neutral position determines the differential between the speeds of the cylinder block and the motor shaft, the pump and motor parts being locked and the cylinder block and the motor shaft rotating at the same speed when the wobbler is in neutral position.

The rotatable cylinder block 16 comprises a pump block 17, a motor block 18 and an annular spacer plate 19. The pump and motor blocks are assembled in line so as to maintain the outside diameter of the cylinder block 16 to a minimum, adapting the unit for high speed operation in which centrifugal forces are kept at a minimum. The pump and motor blocks are secured in end to end relationship, being spaced only by the plate 19. To that end, the blocks 17 and 18 are formed respectively with radially outwardly extending flanges 20 and 21 and passing through these flanges and through the plate 19 are a plurality of bolts 22 by means of which the parts are secured together in fluid-tight relationship.

The cylinder block 16 is rotatably supported in two sets of bearings 23 and 24.

The face of the pump block 17 adjacent the plate 19 is formed with a shallow circular recess 25 which with the plate 19 forms a valve chamber at all times in free communication with a chamber 26 formed by the center of the annular plate 19. Also formed in the block 17 is a plurality of annularly arranged cylinders 27 disposed in parallel relationship with the axis of the unit and opening at the right-hand end as seen in Fig. 1 through the end of the block 17 and opening at the left-hand end to the valve chamber 25. The number of cylinders 27 is large, being in the order of eighteen. Reciprocable in each cylinder 27 is a piston 28 and operable to project in all positions from the right-hand end of the cylinder and in contact with the face of the wobbler 15.

Formed in the corresponding face of the motor block 18 is a shallow, circular recess 30 similar to the recess 25 and likewise forming with the plate 19 a valve chamber in constant communication with the chamber 26. The valve chambers 25 and 30 in addition to being in communication through the chamber 26 are in communication at their peripheries through a plurality of longitudinal passages 31 formed in the plate 19. Also formed in the motor block 18 is a plurality of annularly arranged cylinders 32 disposed parallel with the axis of the transmission unit and opening at one end through the left-hand end of the block 18 and at the other end opening to the valve chamber 30. Reciprocable in each cylinder 32 is a piston 33 which is operable in all positions to project from the left-hand end of the block 18. The motor cylinders, in the embodiment illustrated, correspond in number to the pump cylinders.

Operable in the valve chambers 25 and 30 are identical valves 35 and 36 of the wheel type described in said Wahlmark Patent No. 2,474,706. Each valve is composed of a rim 37 of radial width equal to the diameter of the cylinders, which rim has a close, fluid-tight but sliding fit between the end walls of the valve chamber in which it is located. The rim 37 is connected to and carried by the hub 38 through the medium of spokes which are spaced sufficiently apart so as to leave a plurality of openings through the valve and which also are of reduced thickness compared to the rim 37 in order to permit a ready flow of fluid from one side of the valve to the other as well as circumferentially.

The valves 35 and 36 have a gyratory, as distinguished from a rotary, movement within the valve chamber, serving by such gyratory movement to connect the cylinders in rotational sequence alternately to the periphery of the respective valve chambers outwardly of the rim 37 and to the chambers inwardly of the rim 37, the cylinders being completely closed at the time of reversal of the direction of movement of the corresponding piston. To impart such gyratory movement to the valve relative to the valve chambers the valves are given an eccentric mounting. Thus the eccentric upon which the valve 35 is mounted is stationary and comprises an elongated member 39 secured at 40 to a closure for the transmission unit.

Completing the motor is a swash plate 50 comprising an outer annular member 51 positioned for constant engagement with the left-hand projecting ends of the motor pistons 33. The annular member 51 is, through the medium of thrust ball bearings 52, rotatably mounted on a shaft forming member 53. Suitable and complementary raceways, disposed at a fixed inclination to the axis of the shaft-forming member 53, are formed in the outer annular member 51 for the bearings. The shaft-forming member 53 terminates in an eccentric 54 upon which the valve 36 is rotatably mounted.

It is believed apparent from the foregoing that the cylinder block 17 constitutes the driving part and the member 53 constitutes the driven part of the hydraulic unit.

For rotating the cylinder block there is secured to the drive shaft 10 a spur gear 60 having teeth meshing with the teeth of a second spur gear 61 fixed to the cylinder block 16. The shaft-forming member 53 carries thereon a gear 62 which meshes with a second gear 63 fixed to a drive shaft 64 for driving the alternator 12. Fixed upon the shaft 11 is a worm gear 70 which meshes with a worm 71 which through a right angle bevel gear system generally indicated 72 serves to rotate the flyweights of a centrifugal governor 74 which forms a part of the control system of this invention.

Also fixed to the shaft 11 is another spur gear 75 which meshes with a gear 76 connected to a makeup oil pump 77 and a scavenge oil pump 78 to drive the same. The makeup oil pump 77 receives its oil through a conduit 80 connected to a reservoir (not shown) of oil and discharges into another conduit 81 which passes the oil through a filter 82 and through a first passageway 83 formed in the member 39. The passageway 83 opens to the chamber 26 to supply makeup oil to the pump and motor unit. The volume of oil supplied to the chamber 26 is in excess of the makeup oil requirements so that the oil serves not only makeup purposes but also serves to cool the transmission. The excess oil from the chamber 26 is returned through the member 39 by means of a second passageway 84 formed therein. The passageway 84 connects with a conduit 85 which terminates in a pressure relief valve 86 designed to maintain the makeup oil at a pressure of about 300 p. s. i., oil over that pressure is discharged by the valve 86 through an opening 87 into a segregated space 88 formed in the casing housing the pump and motor. For lubricating the pump and motor the space 88 is defined in part by a wall 89 which is provided with a number of lubricating oil jets indicated at 90 for spraying oil on the various moving parts of the transmission with the pressure within the space 88 being maintained at about 20 p. s. i. by the pressure relief valve 91. Discharge from the pressure relief valve 91 through the opening 92 is directed into the sump of the casing from which it is scavenged by the scavenging pump 78.

The control device 14 is provided for controlling the angle of the wobbler 15 and to this end comprises a pair of opposed piston and cylinder devices. Thus there is provided a cylinder 100 in which a piston 101 is reciprocable, the piston being opposed by a second piston 102 reciprocable in a second cylinder 103. The pistons are connected together by the sleeve 104 and are each connected by means of the rods 105 and 106 to an arm 107 fixed to the wobbler 15. Thus as the pistons reciprocate in their respective cylinders the wobbler is tilted from the angle shown toward the vertical position and beyond to alter the operation of the hydraulic transmission 13.

As previously pointed out, the purpose of the control device is to maintain the speed of the driven shaft 11 and hence of the alternator 12 at a constant predetermined value regardless of changes in speed in the drive shaft 10. Changes in relative speeds between the shafts 10 and 11 are effected by changes in position of the wobbler 15 and the control device 14 which serves to adjust the position of the wobbler. To effect the control of the driven member there is provided the centrifugal governor 74 which is operatively connected into the hydraulic circuit provided for moving the pistons 100 and 102 so as to vary the position of the wobbler as the speed of the driven shaft 11 departs from a predetermined value.

To this end the cylinder 103 is connected by means of the conduit 110 to the space 88 and thus there is constantly applied to the piston 102 the lubricating oil pressure of approximately 20 p. s. i. In the absence of pressure in the cylinder 100 this pressure would serve to move the piston 102 to its extreme rightward position, thus tilting the wobbler from the position shown through neutral to its opposite extreme position. To deliver pressure to the cylinder 100 which, because the pistons are of equal area, must be in excess of lubricating oil pressure, the makeup oil pressure in the conduit 85, which as previously noted is maintained at 300 p. s. i., is piloted off through a conduit 111 and through a pressure differential valve generally indicated at 112 through a governor valve 113 controlled by the governor and thence into a conduit 114 which is ultimately connected to the cylinder 100. Thus, there is available for application to the piston 101 hydraulic fluid under a pressure of as high as 300 p. s. i.

Figure 5:
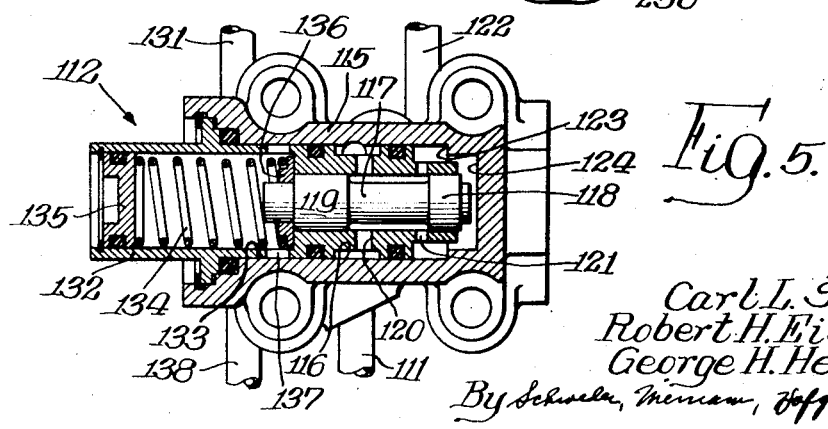
Fig. 5 is an enlarged sectional view of the differential pressure regulating valve.

The differential pressure valve 112 (see Fig. 5) comprises a casing 115 having a bore 116 therein in which there is slidably received a spool type valve 117 having a first land 118 and a second land 119. The conduit 111 is connected to the bore 116 through an internal passage connected to a port 120 intermediate the two lands. An outport 121 is provided in the bore to which there is connected another conduit 122 which leads to the governor valve member 113. Also connected to the outport is a fluid passage 123 formed in the casing which connects that port with one end 124 of the bore. Movement of the spool valve 117 within the bore controls the outport 121 so as to regulate the amount and pressure of fluid delivered into the conduit 122.

The conduit 114 leading from the governor valve 113 connects into a solenoid dump valve 130 and thence into a conduit 131. The conduit 131 connects into a sleeve 132 on the pressure differential valve 112, the sleeve being concentric with the other end 133 of the bore, with the connection being through an internal passage connected to a port 133. Located in the sleeve 132 is a spring 134 which bears against a closure 135 closing the outer end of the sleeve and against a thrust washer 136 adapted to contact the spool valve 117 constantly to urge the spool valve to the right-hand end 124 of the bore. Also located in the end 132 of the bore is another port 137 to which is connected a conduit 138 which opens into the cylinder 100.

From the foregoing it will be noted that the end 124 of the bore, that is on the right side of the land 118, is subjected to the pressure as regulated by the land 118 which passes into the outport 121. This pressure serves to force the spool valve 117 to the left. This force is resisted by the spring 134 and also by the pressure in the sleeve 132 as delivered thereto by the governing valve 113. Thus should there be an increase in makeup pressure in the conduit 111 this pressure is transmitted to the end 124 through the passage 123 and serves to move the spool valve to the left bringing the land 118 at least partially across the port 121 to reduce the pressure delivered into the conduit 122. Similarly should there be a slight drop in makeup oil pressure there is a consequent drop of pressure in the end 124 permitting the spring and the fluid pressure in the sleeve 132 to shift the spool valve to the right uncovering more of the port 121 to increase the pressure delivered to the governor valve 112. Because of the pressure differential valve, slight variations in oil pressure are immediately compensated for without waiting for a speed change, which would otherwise result, to effect compensation. Thus the pressure differential across the governor control valve 113 remains substantially constant so that for any given operating position of that valve, a regulated quantity of oil will flow to the wobbler control cylinder 100. Furthermore, should there be a sudden load imposed on the transmission which would tend to cause the wobbler to tilt toward an underdrive position the pressure in the cylinder 100 and hence in the sleeve 132 would be increased, shifting the spool valve 117 to the right uncovering more of the port 121 and thus increasing the pressure delivered to the cylinder 103 to maintain the wobbler in proper position.

The governor 74 (see Fig. 4) includes a casing 140 in which there is mounted an annular bushing 141 which rotatably supports a sleeve 142 which carries at its upper end a pair of flyweights 143 pivotally mounted thereon and each flyweight is provided with an arm 144 connected to the stem 145 of the governor control valve 113. Rotation of the sleeve 142 is achieved through a drive shaft 146 rotated by the right angle drive mechanism 72. The valve 113 is provided with a reduced portion terminating in a land 148 which makes substantial fluid-tight contact with an elongated passage 149 extending through the center of the sleeve and in which the stem 145 is reciprocable. A main spring 150 is located within a chamber portion 151 adjacent the upper end of the casing and has one end bearing against an adjustable nut 152 threaded in the top of the casing and the other end bears against a thrust washer 153. The washer 153 seats on a bearing 154 which is positioned to be contacted by the arms 144 as they pivot upwardly in response to the rotation of the flyweights 143. Located within the main spring 150 and operating in parallel therewith is a control spring 155 whose lower end bears against the thrust washer 153 and whose upper end is secured to a rod 156 which extends through a central opening in the nut 152 and bears against an eccentric cam 157 secured through a gear reduction drive 158 to a motor 207. An approximate control of the speed of the driven shaft is maintained through the main spring 150 and the control spring 155 is provided for making fine adjustments as will hereinafter be described.

It is believed to be apparent from the foregoing that as the sleeve 142 is rotated with rotation of the drive element 11 the flyweights 143 tend to move outwardly by the centrifugal force imposed upon them, which outward movement is resisted by the main spring 150. Under normal and proper operating conditions the flyweights move out until their centrifugal force is offset by the pressure of the main spring and in such movement lift the valve stem 145 to bring the land 148 into control of a port 160 connected to the passage 149. Oil in the conduit 122 is admitted to that passage through a port 161 and hence may flow into the conduit 114 and eventually into the cylinder 100 to offset the constant force imposed on the piston 102 by the lubricating oil pressure and the varying force imposed by wobbler return movement. In the event the speed of the driven element drops below the desired speed the sleeve 142 will rotate at a lower speed, hence the valve stem and land 148 will move downwardly permitting more oil to flow through the port 160 and into the cylinder 100, while should the speed of the driven element 11 increase beyond the desired amount the land 158 will be moved upwardly to a position blocking the port 160 or be moved about it so that oil pressure in the cylinder 100 may be drained into the passage 149. From this passage oil may pass into a space 162 surrounding the sleeve through small openings 163 in the sleeve and thence into a drain 164 to the sump.

The right angle mechanism 72 (see Fig. 4) includes a casing 170 containing bevel gears and a centrifugal switch mechanism. Thus there is provided a shaft 171 which is secured to the worm 71 and to a bevel gear 172 rotatably mounted on anti-friction bearings 173. The gear 172 meshes with a second bevel gear 174 mounted in the bearings 175 and to which the shaft 146 is fixed for rotating the sleeve of the governor control.

The solenoid dump valve 130 (Figs. 1 and 2) includes a solenoid 190 connected to a stem 191 of a valve member 192 reciprocable in a bore 193 formed in the casing 194 of the dump valve. The solenoid is shown in its normal condition and if energized under conditions hereinafter described the valve 192 is brought up into a position blocking communication between the conduits 114 and 131. The valve 192 is provided with an internal port 195 which permits oil under pressure in the end 132 to pass therethrough into the lower portion of the bore 193 which in turn is connected by means of the conduit 195 to the sump to relieve pressure in the cylinder 100 and hence permit pressure in the cylinder 103 to shift the wobbler to its maximum underdrive position.

The controls described up to this point are sensitive to produce a substantially constant speed of the driven element 11. To effect the fine control necessary to produce an exact frequency of the alternator and also to balance or equalize loading between two alternators operating in parallel the electrical circuit shown in Fig. 3 is provided. Referring to that figure, there are shown two aircraft engines numbered 200 and 201, each of which drives an alternator indicated therein by 202 and 203 through the medium of hydraulic transmissions identical to the one just described and diagrammatically illustrated as 204 and 205. Each of the alternators 202 and 203 are practically identical and accordingly similar reference numerals will be given to similar parts in each system in the following description except that one will be designated by the additional subscript $a$.

Each alternating current generator 202 is rotated by a constant speed drive driven by an engine of the aircraft. The generator 202 is of the three-phase type, but only one of the phases, here designated as 206, is utilized for purposes of effecting control. Each electrical control circuit consists of two distinct parts. One of these is a frequency discriminator circuit utilized to maintain the frequency constant at a preselected value and the other is a load-responsive control circuit to provide equal division of kilowatt load between the alternators 202 and 203 thereby preventing one from momentarily acting as a generator and the other as a motor. The frequency discriminator circuit will be described first.

The function of the frequency discriminator circuit is to deliver to a cam drive motor 207 on the governor assembly a signal which is proportional to small variations in frequency from some preselected value. In producing the variable voltage which is applied to the cam drive motor 207, the terminal voltage from the phase 206 of the alternating current generator 202 is run through a conductor 208 to the primary coil of a transformer 209. The transformer 209 has two secondary windings, each of which energizes a separate tuned filter circuit. One of the tuned filter circuits consists of an inductance 210 in series with a capacitance 211 while the other consists of an inductance 212 in series with a capacitance 213. The alternating output voltages are rectified to direct current voltages by a pair of dry plate rectifier bridge connections 216 and 217. The direct current voltage is developed across two sections 214 and 214' of a potentiometer 215. The sections 214 and 214' are above and below the contact area of the potentiometer. The direct current voltages of each filter circuit are then connected in series opposition across a series of coils 218. Thus, for equal direct current voltage drops across the resistors 214 and 215, zero current flow in the coils 218 is obtained.

The filter circuits 210—211 and 212—213 are adjusted in the well known manner to resonate at about 350 cycles per second and 450 cycles per second, respectively. When the alternator 202 has a frequency of about 400 cycles per second, the direct current output voltages of the two series filters are equal. With a drop in alternator frequency, the direct current output voltage of the filter circuit 210—211 becomes greater than that of the filter circuit 212—213 thereby causing a current to flow through a conductor 219 in the direction indicated by an arrow 220. Conversely, if the alternating frequency is too high a current flow in the direction indicated by an arrow 221 will take place.

Thus, it may be seen that as alternator frequency increases above 400 cycles per second current flowing in the coils 218 is in the direction indicated by the arrow 221. As the alternator frequency decreases below 400 cycles per second the current flowing in the coils 218 is in the direction indicated by the arrow 220.

The coils 218 are part of a magnetic amplifier bridge 222, the purpose of which is to yield an alternating current output at the cam drive motor 207, the magnitude of which is proportional to the magnitude of current flowing through the conductor 219. The phase of the alternating current output will change 180° whenever the current flowing through the conductor 219 reverses direction. Thus, for a current flowing in the direction indicated by the arrow 220 the instantaneous current flow at the cam drive motor 207 is in the direction indicated by an arrow 224; for a current flow in the direction of the arrow 221 the instantaneous current flow to the cam drive motor 207 is in the direction indicated by an arrow 225. This action is obtained by using the Wheatstone bridge principle in the magnetic bridge amplifier 222 and utilizing the fundamental principles underlying the well known saturable reactor.

The cam drive motor 207 is a two-phase induction type electric motor with a pair of windings 226 and 227. The winding 227 is excited from the alternator phase 206 through a phase-shifting condenser 228 by an obvious circuit. The winding 226 is excited from the circuit of the magnetic amplifier bridge 222 which controls directly the amount of alternator voltage applied to winding 226. Thus, output torque at the shaft of the cam drive motor 207 is directly proportional to the applied voltage to winding 226, and the direction of rotation of the shaft of the motor 207 is dependent on the direction of current flow through the winding of the field coil 226.

The setting of the potentiometers 215 and 215$a$ may be changed to permit preselection of frequencies other than 400 cycles per second or to compensate for changes in components with temperature or age or to adjust individual frequencies for parallel operation of the alternators 202 and 203. Obviously a continuous resistor with an adjustable tap may be substituted for these potentiometers.

By way of summarizing the above, the operation of the frequency discriminator circuit is to sense variations in alternator frequency from a preselected value and to cause rotation of the motor 207 and hence of the cam 157 in response to such variations in proportion to the error or deviation in frequency.

The load equalizing circuit has been mentioned previously. The purpose of this circuit is to cause the alternating current generator 202 to share the kilowatt load with the alternating current generator 203 when the two machines are operating in parallel. The function of the load equalizing circuit is to deliver to the respective cam drive motors 207 and 207a on the governor assembly a signal which is proportional to load unbalance. This signal is derived from a circuit which is responsive to real power only and not to reactive power, assuming that voltage regulation is utilized in the main electrical circuit to maintain a constant output voltage. In the operation of the load equalizing circuit, terminal voltage from the phase 206 of the alternating current generator 202 energizes the primary coil of a transformer 230. Another signal which is proportional to load current is obtained from a current transformer 231 and fed into a resistor 232 connected to a mid-tap of the secondary of the transformer 230. This latter signal is added and subtracted vectorially from the voltage signal; the results of addition and subtraction appear in a pair of transformers 233 and 234, respectively.

The outputs of the transformers 233 and 234 are rectified by a pair of dry plate rectifier bridge connections 235 and 236. The resulting two direct current signals are subtracted and their difference represents a direct current voltage proportional to real load. Only during parallel operation of the alternators 202 and 203 is this direct current voltage utilized.

In parallel operation a circuit breaker 237 connects the load equalizing circuits of each alternator drive in series. The real loads on the two alternators 202 and 203 create direct current voltages across resistors 238 and 238a which serve as a variable potentiometer control. Since the circuits in which these direct current voltages are developed are connected in series, voltages are subtracted and a current proportional to the voltage difference is caused to flow in a direction indicated by an arrow 239 or an arrow 240, the direction depending upon the relative electrical unbalance. This signal is magnified by passage through a number of coils 241 in the magnetic amplifier bridge circuit 222 of each electrical governing system as described in the operation of the frequency discriminator circuit. Output voltage to the cam drive motor 207 of each system then is such as to cause rotation of the motor shaft in a direction which momentarily effects a correction upon the control mechanism of the hydraulic transmission. In this way, real load on the aircraft electrical system is shared equally by each of the alternators operating in parallel.

The cam drive motor 207 is connected through the reduction gear 158 to the cam 157 to rotate the same and hence to increase or decrease the tension of the control spring 150 against the upper end of the valve stem 145, thus slight variations in the control valve 113 are effected.

It will be clear from the foregoing that in the event a single alternator is used the load equalizing electrical circuit is unnecessary, but should two or more alternators be operated in parallel each will be driven by a separate hydraulic transmission of the type shown in Fig. 1 and each will be provided with electrical systems operating on individual cam driving motors for each hydraulic transmission.

Centrifugally operated overspeed and underspeed switches are provided within the right angle drive 72. Switches are so designed as to prevent the alternator from being cut into the circuit until it has reached a certain predetermined minimum speed and also to move the speed control means for the hydraulic transmission to maximum underspeed in the event of malfunction of the control which imparts an excessive speed to the alternators.

To this end the bevel gear 172 is provided with a flange portion 250 secured thereto on which are pivotally mounted a plurality of flyweights 251. Each flyweight is provided with an arm 252 adapted, when pivoted by centrifugal force operating on the flyweights, to move a rod 253 toward a switch assembly 254 located within the casing of the right angle drive. The rod 253 is held slidably within an opening 255 in a partition 256 within the housing by means of a groove 257 engaged by a detent mechanism 258. As the rod moves to the left from the position shown in Fig. 4 it is moved into contact with a blade 260 of a knife switch mechanism. The blade 260 is pivotally mounted at 263 and held against the free end of the rod 253 by a plunger 261 urged thereagainst by a spring 262. Upon counterclockwise pivotal movement about the point 263 the blade 260 is moved against the contact 264 of an underdrive switch 265. Until the contact 264 is closed the alternator connected to the hydraulic transmission involved is cut out of the electrical circuit. When the alternator has reached the minimum operating speed the contact 264 is closed to cut the alternator into the circuit by well known means.

In the event the hydraulic transmission drives the alternator at an excessive speed the flyweights 251 will force the rod 253 to the left to a greater extent until the knife arm 260 is brought against the contact 266. This contact closes the circuit through the solenoid 190 to lift the valve 192 therein to a position wherein the fluid in the conduit 131 and hence the cylinder 100 will be dumped into the drain 196. This, of course, effects an immediate reduction to the lowest possible speed of the driven element. To prevent the driven element from again being speeded up by the operation of the governor, the valve stem 192 is provided with a dentent 270 at its lower end which is engaged by a spring operated latch mechanism 271 to hold the stem in the elevated position it obtains when the solenoid is energized. Thus when the solenoid is deenergized with decrease of speed, the valve 192 remains in the dumping position until the latch and detent mechanism are manually reset, which will presumably be after the condition which caused the overspeed has been corrected.

We claim:

1. In combination, a driving element, a driven element, a hydraulic transmission operatively interposed between said elements including adjustable means for varying the operation of said transmission to obtain a constant speed of said driven element while the speed of the driving element varies above or below the speed of said driven element, means for adjusting said adjustable means comprising a pair of opposed piston and cylinder devices connected to said adjustable means, pressure producing means driven by said driving element for supplying fluid under pressure to operate said devices, means for constantly subjecting one of said devices to fluid under pressure, means for supplying fluid under pressure to the other of said devices, and means for varying the fluid pressure applied to said other device including valve means controlling the supply of fluid to said other device, a governor for operating the valve means and including rotatably mounted flyweights connected to the driven element, resilient means opposing the centrifugal force of the rotating flyweights, a second resilient means operating in parallel with the first resilient means to oppose movement of the flyweights, means sensing the departures from a condition to be met by proper speed of the driven element, and means actuated by the sensing means and operating to regulate the force applied by the second resilient means in accordance with said departures from said condition.

2. In combination, a driving element, a driven element, a hydraulic transmission operatively interposed between said elements including adjustable means for varying the operation of said transmission to obtain a constant speed of said driven element while the speed of the driving element varies above or below the speed of said driven element, means for adjusting said adjustable means comprising a pair of opposed piston and cylinder devices connected to said adjustable means, pressure producing means driven by said driving element for suplying fluid under pressure to operate said devices, means for constantly subjecting one of said devices to fluid under pressure, means for supplying fluid under pressure to the other of said devices, and means for varying the fluid pressure applied to said other device including valve means controlling the supply of fluid to said other device, a governor for operating the valve means and including rotatably mounted flyweights adapted to be rotated by the driven element, a main spring opposing the centrifugal force of the rotating flyweights, a control spring operating in parallel with the main spring to oppose the centrifugal force of the flyweights, an electric motor for regulating the tension of said control spring, means sensing departures from a condition to be met by proper speed of the driven element and operating to generate an electrical current in response to such departures, and means for transmitting said current to the motor to regulate the tension of said control spring in accordance with said departures from said condition.

3. In combination, a driving element, a driven element, a hydraulic transmission operatively interposed between said elements including adjustable means for varying the operation of said transmission to obtain a constant speed of said driven element while the speed of the driving element varies above or below the speed of said driven element, means for adjusting said adjustable means comprising a pair of opposed piston and cylinder devices connected to said adjustable means, pressure producing means driven by said driving element for supplying fluid under pressure to operate said devices, means for constantly subjecting one of said devices to fluid under pressure, means for supplying fluid under pressure to the other of said devices, and means for varying the fluid pressure applied to said other device including valve means controlling the supply of fluid to said other device, a governor for operating the valve means and including rotatably mounted flyweights adapted to be rotated by the driven element, a main spring opposing the centrifugal force of the rotating flyweights, a control spring operating in parallel with the main spring to oppose the centrifugal force of the flyweights, signal responsive means for regulating the tension of the control spring, means sensing departures from a condition to be met by proper speed of the driven element and operating to generate a signal in response to such departures and means for transmitting the signal to said signal responsive means to regulate the tension of said control spring in accordance with said departures from said condition.

4. In combination, a driving element, a driven element, a hydraulic transmission operatively interposed between said elements including adjustable means for varying the operation of said transmission to obtain a constant speed of said driven element while the speed of the driving element varies above or below the speed of said driven element, means for adjusting said adjustable means comprising a hydraulic device connected thereto, a source of hydraulic fluid under pressure connected to said device, valve means governing the supply of hydraulic fluid to said device, a governor for operating the valve means and connected to said driven element, signal responsive means operating in parallel with the governor for controlling the supply of fluid to said device, means sensing departures from a condition to be met by proper speed of the driven element and operating to generate a signal in response to such departures, and means for transmitting said signal to said signal responsive means.

References Cited in the file of this patent

UNITED STATES PATENTS

| | | |
|---|---|---|
| 743,484 | Gerdes | Nov. 10, 1903 |
| 1,240,325 | Earl | Sept. 18, 1917 |
| 2,161,439 | Thoma | June 6, 1939 |
| 2,291,011 | Vickers | July 28, 1942 |
| 2,360,025 | Wahlmark | Oct. 10, 1944 |
| 2,455,070 | Lawrence | Nov. 30, 1948 |
| 2,485,126 | Wood | Oct. 18, 1949 |
| 2,518,129 | Eichhorn | Aug. 8, 1950 |
| 2,566,694 | Chillson | Sept. 4, 1951 |
| 2,597,177 | Plass | May 20, 1952 |